HISAMINE KOBAYASHI,
ETSUO KAJITA AND
SADAMASA SUZUKI,
INVENTORS

United States Patent Office 3,526,602
Patented Sept. 1, 1970

3,526,602
CATALYST CARRIER AND PROCESS
OF MAKING THE SAME
Hisamine Kobayashi, Nagoya, Etsuo Kajita, Tajimi, and Sadamasa Suzuki, Tsushima, Japan, assignors to Kabushiki Kaisha Shikishima Mul-BII, Aichi Prefecture, Japan
Filed Feb. 9, 1968, Ser. No. 704,324
Int. Cl. B01j 11/82
U.S. Cl. 252—443          20 Claims

ABSTRACT OF THE DISCLOSURE

The disclosed porous catalyst carrier comprises an inorganic aggregate in the form of granules interconnected by a sintered, inorganic bonding material to form between them numerous micro-holes opening into its surface including relatively regular recesses and many small cave-shaped holes communicating with the micro-holes. The holes are uniformly distributed in the carrier having narrow pore size distribution of predetermined different radii. For each of the pore sizes, a predetermined amount of an organic hole-forming material having a predetermined particle size is used to form a group of grains and these groups of grains separately formed are intermixed to form the final pellets for the carriers which are, in turn, sintered.

---

This invention relates to improved porous catalyst carriers and a process of producing the same.

With the recent advancement of the catalyst technique, the demand for catalyst carriers has increased. Conventional inactive catalyst carriers for use in oxidation reactions are composed of grains of pumice, or fused aluminum oxide, or broken bricks. Such carriers are not only very coarse and uneven in structure, but also they are liable to be broken and had the tendency to cause the particular catalyst attached thereto to be easily dropped therefrom. Thus, such catalyst carriers are not always suitable.

Recently there have been developed porous catalyst carriers including, as an aggregate, a highly pure inorganic material such as fused aluminum oxide or silicon carbide in grain form and substantially uniform in particle size and improved in performance. These carriers might be of various fine structures such as a composite structure consisting of an impermeable or not-impregnatable solid core portion and a porous shell portion enclosing the core portion, of a uniformly porous structure, or of a structure including either of the structures just described and a surface layer having voids scattered therein. The fine structure of a catalyst carrier depends upon the particle sizes and amounts of ingredients involved and could be controlled in porosity, volumes of micro-voids and surface area, etc. However, the fluctuation of the dimensions of the micro-voids varies largely between the resulting structures. Thus, it was impossible to produce porous catalyst carriers having any given void dimension and any given number of voids or any given void volume. Further, with the porosity exceeding 45% these carriers are very brittle and not always suitable for use in oxidation reactions.

Lately, there has been a great demand for an inactive catalyst carrier having a porosity as high as in excess of 50% while retaining a high mechanical strength, a large surface area and a stable structure.

Accordingly, it is an object of the present invention to provide a new and improved catalyst carrier having a very porous yet strong structure in which voids are uniformly distributed in a precisely controlled manner.

It is another object of the present invention to provide a new and improved porous catalyst carrier to which a catalyst can be attached in controlled amounts whereby the capability of the catalyst is stabilized at its high level, while the carrier is prevented from accumulating therein a reaction heat due to the operation of the catalyst.

According to one aspect of the invention there is provided a porous catalyst carrier having a sintered structure comprising an inorganic aggregate material in the form of granules interconnected by a sintered, inorganic bonding material to form a multiplicity of micro-holes and cave-shaped holes uniformly distributed therein. The micro-holes open into the surface of the structure while the cave-shaped holes communicate with the cave-shaped holes. The structure has a narrow pore size distribution of cave-shaped holes and micro-holes of predetermined different diameter.

Preferably the aggregate material may be a material selected from the group consisting of fused aluminum oxide, silicon carbide, zircon and mixtures thereof; while the bonding material may be selected from the group consisting of fusible clays, porcelain clays and mixtures thereof.

The catalyst carrier may be of any desired shape such as a sphere, a cylinder, a truncated cone, a disc, an annulus or the like. If desired, it may include a solid core portion substantially free from voids and a shell portion having the structure just described and enclosing the core portion.

Another aspect of the invention contemplates a process of producing porous catalyst carriers of the type as above outlined. The process comprises the steps of mixing a pulverized inorganic aggregate material with an inorganic bonding material and a pulverized organic void-forming material capable of being completely converted to a gaseous state at an elevated temperature, forming pellets from this mixture, and sintering the pellets. The process is characterized in that the organic void forming material is used in a predetermined amount to form one batch of aggregate grains, and that the batches of aggregate grains separately formed are mixed together and formed into the carrier pellets.

Preferably the organic material may be selected from the group consisting of walnut shell, Indian corn-core, cotton yarn waste, wooden scobs and synthetic resins such as styrene resins.

The invention will become more readily apparent from the following description taken in conjunction with the accompanying drawing in which.

A catalyst carrier according to the invention may be of any desired shape, such as a cylinder, a truncated cone, a disc, an annulus or the like as above described and may have either a uniformly porous structure or a composite structure comprising a substantially impermeable or not-impregnatable solid core portion and a uniformly porous shell portion enclosing the core portion as do the prior art catalyst carriers. The porous portion of the present carriers have a structure such as typically shown in FIG. 1.

Figure 1:
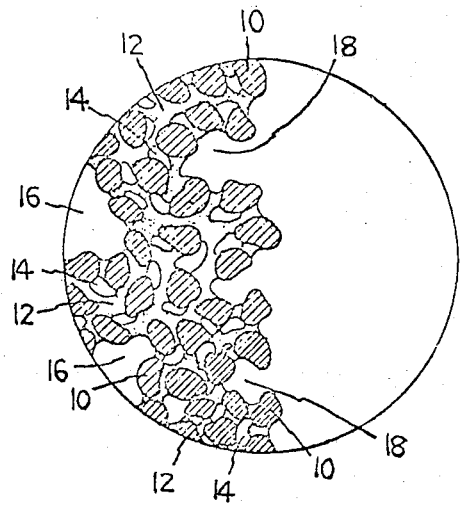
FIG. 1 is a greatly enlarged view of one portion of an edge of a diametric section of a spherical catalyst carrier according to the invention.
Figure 2:
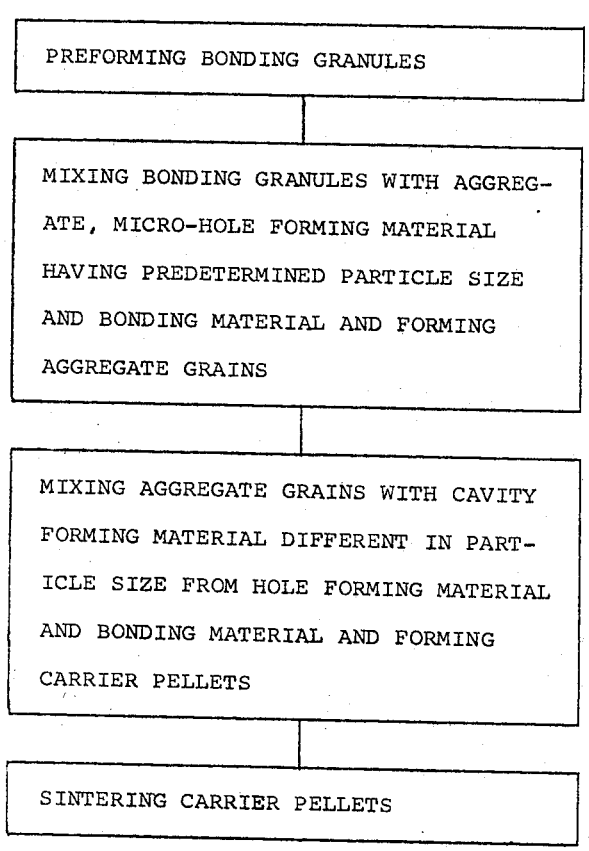
FIG. 2 is a flow sheet illustrating one example according to the process of the invention.

FIG. 1 shows, in greatly enlarged scale, one portion of an edge of a diametric section of a spherical catalyst carrier according to the invention. The structure illustrated comprises an inorganic aggregate in the form of grains 10 interconnected by sintered bits 12 of inorganic bonding material to form a multiplicity of micro-holes 14 substantially uniformly distributed therebetween and opening into the surface of the structure. The structure further includes discrete cave-shaped holes or cavities 16 substantially uniformly distributed therein and relatively regular cavities such as shown by the reference numeral 18. The cave-shaped holes 16 communicate with the adjacent micro-holes 14. If desired, the sintered bonding bits may have micro-holes smaller than the micro-holes 14 and substantially uniformly distributed therein.

As will be described hereinafter, the structure illustrated is characterized in that the micro-holes and cave-shaped holes 14 and 16 are distributed in the structure having narrow pore size distribution of two predetermined different radii. The term "radius" includes radius if the hole is circular, or the radius of circle whose area is substantially equal to the cross sectional area of the hole provided that it is not circular. In other words, the holes have radii approximating at least two different values, respectively, and the volumes, number and radii of the holes can be accurately controlled.

In order to produce catalyst carriers having the structure just described, another aspect of the invention provides a process comprising the steps of (1) mixing a pulverized inorganic material with an inorganic bonding material to form bonding granules, and coating the bonding granules with an organic surface forming material; (2) mixing the coated bonding granules with a predetermined amount of a pulverized organic micro-hole forming material having a predetermined particle size and coated with a pulverized bonding material, and forming the mixtures into aggregate grains; (3) mixing the aggregate grains with a predetermined amount of a pulverized cavity forming material having a predetermined particle size and coated with a pulverized bonding material, and forming the resulting mixture into carrier pellets having any desired shape and dimension; and (4) sintering the carrier pellets. The process just described provides catalyst carriers having voids such as micro-holes and cave-shaped holes distributed therein, and having narrow pore size distribution of two predetermined different radii, due to the micro-hole and cavity forming material respectively.

In order to prepare a carrier having narrow pore size distribution of three predetermined different radii, the process as above described is repeated except that the bonding granules include, in addition to the bonding material, a pulverized organic micro-hole forming material having a predetermined particle size. In order to provide catalyst carriers having voids distributed therein into four or more predetermined radii, the bonding granules prepared in the way may be used in the step (2) which is, in turn, carried out separately the same number of times as the number of the radii minus two with the micro-hole forming material different in amount and particle size. The volumes and radii of the voids can be controlled by adjusting the amount and particle size of the micro-hole and cavity forming materials used in each of the mixing and forming steps.

Suitable examples of the inorganic bonding material include fusible clays capable of being melted by heating and cooled into solid solutions, porcelain clays and mixtures thereof; and the inorganic aggregate material is at least one selected from the group consisting of fused aluminum oxide, silicon carbide and zircon.

The organic surface, micro-hole and cave-shaped hole forming materials should have such a property that they are completed converted to a gaseous state to escape from the pellets during the sintering operation. Suitable examples of such materials are vegetable materials such as walnut shell, Indian corn-core, cotton yarn waste, wooden scobs and styrene resins in the form of fibers, granules, or finely divided particles. It has been found that Indian corn-core, cotton yarn waste and styrene resins in the form of granules or finely divided particles are particularly suitable for use as the micro-hole forming material while a crushed walnut shell is particularly suitable for use as the cave-shaped hole forming material.

The following examples illustrate the practice of the invention and the proportions of the ingredients are expressed by weight unless otherwise stated.

EXAMPLE I 100 parts of a mixture of levigated fusible and procelain clays were mixed with from 3 to 5 parts of an inorganic aggregate material such as above described having a particle size of from 300 to 1500 meshes, and an adhesive material consisting of from 2 to 6 parts of an aqueous solution of 0.8% carboxymethyl cellulose. The resulting mixture passed through a suitable extruding machine followed by cutting to form small granules having a diameter of approximately 0.5 mm. and a length of the order of 0.5 mm. Then all the granules were coated with from 1 to 2 parts of a pulverized organic surface forming material having a particle size of from 100 to 300 meshes to provide regular surface recesses on the bonding granules. The surface forming material has the property similar to that of the micro-hole and cavity forming material and serves to form regular recesses on the surfaces of the bonding granules when sintered to thereby increase the surface area of the sintered bonding granules. It has been found that such a material is preferably wood scobs.

From 12 to 15 parts of the bonding granules were slowly and sufficiently mixed with from 75 to 67 parts of any of the above-mentioned aggregate material having a particle size of 150 meshes and from 5 to 7 parts of the micro-hole forming material as above described having a particle size of from 100 to 200 meshes and coated with an aqueous solution of from 5 to 6 parts of a mixture of levigated fusible and porcelain clays and from 3 to 5 parts of the same adhesive material as above described by a spraying technique, and then passed through a suitable extruding granulator to form relatively large aggregate grains. In this mixing operation it is to be noted that the structure of the bonding granules should be broken as little as possible.

Then from 85 to 70 parts of the grains thus prepared were mixed with from 7 to 15 parts of a cavity forming material such as above described having a particle size of from 8 to 60 meshes and coated with from 6 to 10 parts of the above-mentioned clays and from 3 to 5 parts of the above-mentioned adhesive material. The resulting mixture was then passed through a suitable extruding granulator or molding press to form the final pellets having any desired shape and any desired dimension such as previously described.

In order to sinter these pellets to produce the carriers, they were passed through a tunnel kiln of the well known variety including a pre-heating zone, a sintering zone and a cooling zone. More specifically, the pellets passed through the pre-heating zone in a period of time of approximately 10 hours, where their temperature was slowly raised from room temperature to a sintering temperature of from 1000° C. to 1400° C. Then the pre-heated pellets passed through the sintering zone having an oxidizing or a reducing atmosphere at the said temperature in a period of time of approximately 10 hours, where they were sintered. During the sintering operation, the organic material having the different particle sizes were converted to a gaseous state to escape from the pellets leaving a multiplicity of micro-holes and cave-shaped holes in the latter pellets. The sintered pellets then passed through the cooling zone in a period of time of the order of 10 hours until they were cooled to room temperature. It is important that the sintering temperature should be determined in accordance with the fusing temperature of the bonding material involved which should, in turn, be selected on the basis of the refactory properties of the completed carriers, and therefore of a temperature at which the particular catalyst associated with the carriers is effective for a desired oxidation reaction.

The resulting carriers were tested and exhibited narrow pore size distribution of two predetermined different radii as will be described hereinafter.

EXAMPLE II

The procedure of Example I was repeated excepting that the bonding granules were composed of 100 parts of a mixture of levigated fusible and porcelain clays, from 5 to 25 parts of one of the above-mentioned aggregate materials having a particle size of from 300 to 1500 meshes, from 5 to 10 parts of one of the above-mentioned micro-hole forming materials having a particle size of from 100 to 300 meshes, and from 2 to 3 parts of an aqueous solution of 0.8% carboxymethylcellulose. The results of tests indicated that the voids formed in the carriers were distributed into three predetermined different radii as will be described hereinafter.

Various tests were conducted with the catalyst carriers of Examples I and II labelled "Ma-2156-1" and "M-2156-2," respectively, and also with spherical carriers of the prior art type for comparison purpose. The results of the tests are listed in the following Tables I and II wherein the prior art type carriers are labelled "Prior art."

Figure 3:
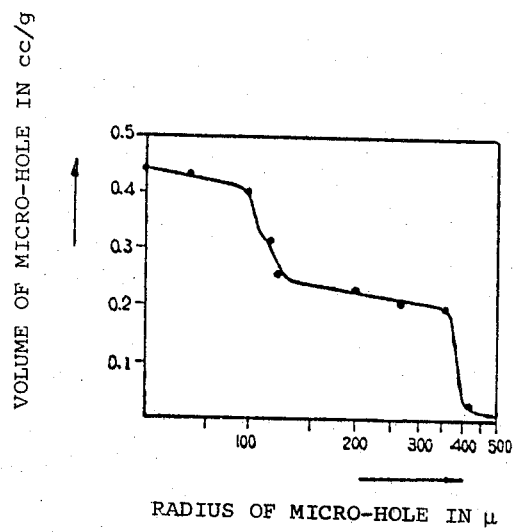
FIGS. 3 and 4 are graphic cumulative distribution curves of voids formed in the present catalyst carriers.
Figure 4:
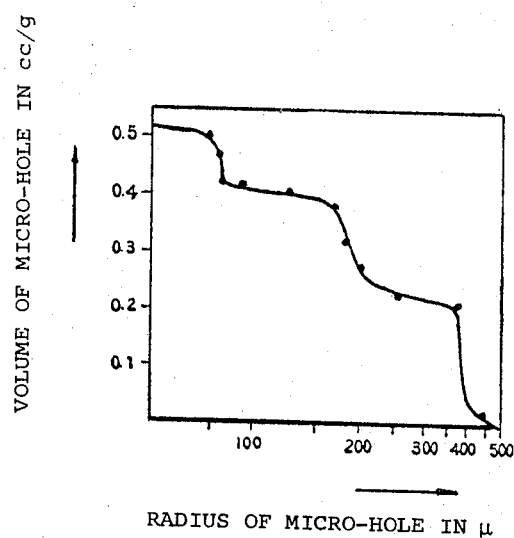
Figure 5:
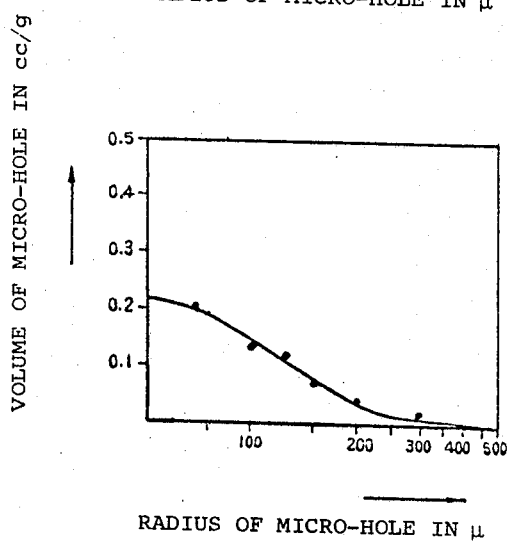
FIG. 5 is a graph similar to FIGS. 3 and 4 but illustrating the prior art type of catalyst.

The measurement just outlined was conducted with the carriers listed in Tables I and II and its results are illustrated in FIGS. 3, 4 and 5, wherein the axes of abscissa represent the radii in microns of the voids or the micro-holes and cave-shaped holes corresponding to the pressure applied to the mercury, and the axes of ordinate represent the total volume in cubic centimeters per gram of the voids having the particular radius and radii greater than it. FIGS. 3, 4 and 5 illustrate distribution curves of the volumes of the voids for the carriers Ma-2156-1, Ma-2156-2 and the prior art type carrier, respectively. As shown in FIGS. 3 and 4, the total volume of the voids suddenly increases from a certain value, such as 400 microns, of the micro-holes. Then the total volume is very slowly increased as the radius decreases to a second certain value. Beyond this second certain value, the total volume again increases suddenly followed by a slow increase in total volume with a decrease in radius. The upper and lower steep stairs resulted from the micro-hole and cavity forming materials, respectively, indicating narrow pore size distribution. For the carriers of Example II, this change in total volume occurs once more as shown in FIG. 4 with the uppermost steep stair resulting from the micro-hole forming material included in the bonding granules.

TABLE I.—CHEMICAL COMPOSITION

| Sample | Ingredients | | | | | | | |
|---|---|---|---|---|---|---|---|---|
|  | $Al_2O_3$ | $SiO_2$ | $Fe_2O$ | $TiO_2$ | CaO | MgO | $Na_2O$ | $K_2O$ |
| Ma-2156-1 | 82.6 | 14.8 | 0.07 | 0.1 | 0.63 | 0.4 | 0.7 | 0.7 |
| Ma-2156-2 | 81.8 | 15.2 | 0.1 | 0.2 | 0.7 | 0.5 | 0.8 | 0.7 |
| Prior art | 79.4 | 17.1 | 0.2 | 0.3 | 0.8 | 0.5 | 0.9 | 0.8 |

TABLE II.—PHYSICAL PROPERTIES

| Sample | Apparent [1] sp. gravity in g./cc. | Bulk [2] sp. gravity in g./cc. | Volume [3] density in g./cc. | Porosity in percent | Radius of micro-holes in $\mu$ | Volume of voids in cc./g. | Surface area in m.²/g. | Percent attrition in percent |
|---|---|---|---|---|---|---|---|---|
| Ma-2156-1 | 3.1 | 1.31 | 0.77 | 57.6 | Fig. 3 | 44.1 | <1 | 7 |
| Ma-2156-2 | 3.2 | 1.21 | 0.70 | 62.0 | Fig. 4 | 51.2 | <1 | 9 |
| Prior art | 3.07 | 1.72 | 0.85 | 39.0 | Fig. 5 | 25.5 | <1 | 11 |

[1] Apparent specific gravity means a specific gravity of a carrier assumed as being a solid body including no micro-hole nor cave-shaped holes.
[2] Bulk specific gravity means a specific gravity of a carrier including the voids or micro-holes and cave-shaped holes.
[3] Volume density means a density with which a number of the carriers occupies a predetermined volume.

In order to determine the radii of the voids or the micro-holes and cave-shaped holes or voids and a cumulative distribution of volumes of the voids, one can utilize the so-called high pressure mercury method developed by L. C. Drake and H. L. Ritter [see Ind. Eng. Chem. (Ana. ed.) vol 17, pages 782, 787 (1945); Ind. Eng. Chem., vol. 41, page 780 (1949)]. According to the principles of the high pressure mercury method utilizing the surface tension of mercury, a porous body to be measured is first degassed under a vacuum having for example a pressure of $10^{-4}$ mm. Hg and then immersed into a quantity of mercury. Assuming that the voids in the body are circular, a pressure P applied to the mercury permits it to be forced into the voids having a radius greater than that satisfying the equation $P = -2\sigma \cos \theta / r$, where $\sigma$ is the surface tension of mercury, $\theta$ is a contact angle and $r$ is a radius of the void. If the void is not circular, its radius can be considered to be substantially equal to a radius of a circle whose area is substantially equal to the cross sectional area of the void. As the pressure applied to the mercury increases the mercury will be progressively forced into the smaller voids in accordance with the value of the pressure. For each increment of pressure, the amount of mercury forced into the voids is measured by any suitable means to determine the total volume of the voids having the particular radius and radii greater than it. The particular radius is determined by the magnitude of the pressure applied to the mercury, assuming that the voids are in vacuum. Preferably, nitrogen gas or any suitable oil may be used to increase the pressure on mercury beyond the atmospheric pressure.

Thus, it will be appreciated that the narrow pore size distribution curves of the volume of the voids of Examples I and II show two or three predetermined different radii, respectively. This is the characteristic feature of the present carriers as compared with prior art type carriers such as shown in FIG. 5, wherein the corresponding curve gradually changes.

In Table II it should be noted that the carriers according to the invention have porosities as high as 57.6 and 62.0% for Ma-2156-1 and Ma-2156-2, whereas the prior art type carriers have only a porosity of 39%. Nevertheless the present carriers have a percent attrition loss of 7 or 9% for Ma-2156-1 or Ma-2156-2, respectively, less than that of 11% for the prior art type carriers. This means that the catalyst carriers according to the present invention are greatly increased in strength, and therefore very economical from the standpoint of use.

In order to produce catalyst carriers having a narrow pore size distribution of four predetermined different radii, the procedures of Example II include the aggregate grain forming step as described for Example I divided into two steps in which two predetermined quantities of organic micro-hole forming material different in particle size are separately used to form two batches of grains. Then the two batches of grains are used to form the pellets for the carriers as previously described in Example I.

Unlike the conventional process by which an aggregate material, a bonding material, an organic micro-hole forming material, etc. are intermixed in a single step, the present process is characterized in that for each of the pore sizes, an organic void forming material having a predetermined particle size is used in a predetermined amount to form one batch of grains, with the amount and particle size thereof dependent upon the value of the desired total volume of the voids and the desired range of radii of the voids. Then, such batches of grains are combined to form the final pellets.

Upon applying the invention to the production of catalyst carriers having a composite structure having a substantially impermeable or not-impregnateable solid core portion and a uniformly porous shell portion enclosing the core portion, the core portion may be composed of porcelain clays, bauxite or mullite. The following Example III illustrates by way of example the production of such a composite structure.

EXAMPLE III

| | Parts |
|---|---|
| Levigated silica having a particle size of 300 meshes | 40 |
| Calcinated bauxite having a particle size of 16 to 180 meshes | 40 |
| Mixture of fusible and porcelain clays levigated | 20 |
| Carboxymethylcellulose (as 0.5% solution) | 5 |

The above-mentioned materials were ball-milled and formed into any desired shapes. Then the shaped bodies were coated with a carrier-pellet forming material prepared by the procedure of Example I or II and formed into the final pellets. The pellets were sintered in the manner as previously described for Example I.

The conventional type of catalyst carriers such as previously described in conjunction with FIG. 5, are disadvantageous in that they have a catalyst unevenly attached thereto or impregnated thereinto, and that in operation the reaction heat is accumulated in their interior to deteriorate the catalyst as well as decreasing its useful life. It has been found that the present carrier can have a catalyst uniformly attached thereto in a controlled amount, thereby to provide a very stable catalystic performance. In addition, definite sizes of cave-shaped holes and micro-holes prevent the reaction heat from being accumulated in the interior of the carrier, with the result that a very high yield is attained even at a high space speed and with a high concentration of raw material.

In order to demonstrate the advantages of the invention, the following Example IV will be described in terms of the production of anhydride phthalic acid through oxidation of orthoxylene.

EXAMPLE IV

The procedure of Example III was repeated to form cores in the form of spheres having an outside diameter of approximately 3.5 mm.

Then the procedure of Example I is repeated, except for the use of the following materials in the following amounts, expressed by weight.

(1)

| | Parts |
|---|---|
| Mixture of fusible and porcelain clays levigated | 100 |
| Silicon carbide having a particle size of 300 meshes | 3 |
| Solution of 0.8% carboxymethylcellulose | 5 |
| Wooden scobs having a particle size of 200 meshes | 1 |

The above cited materials were intermixed and formed into bonding granules.

(2)

| | Parts |
|---|---|
| Bonding granules | 15 |
| Silicon carbide having a particle size of 150 meshes | 70 |
| Styrene resin having a particle size of 120 meshes | 6 |
| Mixture of fusible and porcelain clays levigated | 5 |
| Solution of 0.8% carboxymethyl-cellulose | 4 |

The above-mentioned materials were intermixed and formed into aggregate grains.

(3)

| | Parts |
|---|---|
| Aggregate grains | 72 |
| Walnut shell having a particle size of 60 meshes | 8 |
| Mixture of fusible and porcelain clays levigated | 15 |
| Solution of 0.8% carboxymethylcellulose | 5 |

The resulting mixture of these materials coated the cores to form carrier pellets in the form of spheres having a diameter of approximately 5.5 mm. The pellets thus formed were dried and sintered into spheres having a diameter of approximately 5 mm. and a porous shell portion approximately 1 mm. thick.

A mixture consisting of 87.7 parts of ammonium metavanadate, 4.5 parts of potassium nitrate and 7.8 parts of tin chloride in water was impregnated into the carriers thus prepared. The impregnated carriers were dried and fired at a temperature of from 450° to 500° C. to form a catalyst of vanadium pentoxide in the carriers. Thus, the catalyst was deposited on the surface of and in the interiors of the micro-holes and cave-shaped holes in each carrier. The carriers had a porosity of 54% by volume, a cumulative distribution curve of void volume as shown in FIG. 3, and a surface area of 1 square meter per gram or less.

For comparison purposes, a catalyst, vanadium pentoxide, was deposited on pumice and on fused aluminum oxide crushed into dimensions of approximately 5 mm. under the same conditions as above described. In order to produce anhydride phthalic acid, three types of the carrier catalyst thus prepared were used in oxidizing orthoxylene in gaseous phase at a reaction temperature of from 450° to 500° C., and a space speed of from 6,000 to 10,000 litres per gram per hour, with the raw material having a concentration of from 40 to 60 grams per cubic meter. The present, pumice and fused aluminum oxide carriers resulted in yields of 100, 74 and 85%, respectively. Also the useful life of the catalyst was 1 for the present carriers, and 0.51 and 0.64 for the pumice and aluminum oxide carriers, respectively. Thus it will be appreciated that the present carrier is a significant advance over the conventional type of catalyst carriers in both yield and life.

EXAMPLE V

The procedure of Example IV was repeated. The resulting catalyst provided yields as set forth in the following Table III.

TABLE III.—REACTION CONDITIONS AND YIELD

| Max. temp. of catalyst layer in ° C. | 460 | 470 | 480 | 490 | 500 |
|---|---|---|---|---|---|
| Concentration of raw gas in g./m.$^3$ | 50 | 50 | 50 | 50 | 50 |
| Space velocity in l./g./hr.$^{-1}$ | 6,000 | 7,000 | 8,000 | 9,000 | 10,000 |
| Yield of anhydride phthalic acid in percent | 102 | 100 | 100 | 100 | 99 |

EXAMPLE VI

The procedure of Example IV was repeated to produce catalyst carriers. A catalyst vanadium pentoxide was deposited on the carriers in a similar manner as described for Example IV and was used in producing anhydride phthalic acid. The reaction conditions and yield are listed in the following Table IV.

TABLE IV.—REACTION CONDITIONS AND YIELD

| Max. temp. of catalyst layer in ° C. | 460 | 470 | 480 | 490 | 500 |
|---|---|---|---|---|---|
| Concentration of raw gas in g./m.$^3$ | 40 | 45 | 50 | 55 | 60 |
| Space velocity in l./g./hr.$^{-1}$ | 6,000 | 6,000 | 6,000 | 6,000 | 6,000 |
| Yield | 103 | 101 | 100 | 99 | 96 |

While the invention has been described in, conjunction with several embodiments and examples thereof it is to be understood that various changes and modifications may be resorted to without departing from the spirit and scope of the invention.

What we claim is:

1. A porous catalyst carrier having a sintered structure comprising an inorganic aggregate material in the form of granules interconnected by a sintered, inorganic bonding material to form a multiplicity of micro-holes and cave-shaped holes uniformly distributed in the said structure, said micro-holes opening into the surface of said structure, said cave-shaped holes communicating with said micro-holes to provide a narrow pore size distribution of two predetermined radii.

2. A porous catalyst carrier as claimed in claim 1, wherein said sintered bonding material includes micro-holes uniformly distributed therein and said micro-holes have narrow pore size distribution of at least three predetermined different radii.

3. A porous catalyst carrier as claimed in claim 1, wherein said aggregate material is a material selected from the group consisting of fused aluminum oxide, silicon carbide, zircon and mixtures thereof.

4. A porous catalyst carrier as claimed in claim 1, wherein said bonding material is selected from the group consisting of fusible clays, porcelain clays and mixture thereof.

5. A catalyst carrier, comprising a substantially impermeable core portion composed of a sintered member of an inorganic material selected from the group consisting of porcelain clays, bauxite and mullite, and a shell portion enclosing said core portion and having the structure as defined in claim 1.

6. A process of producing porous catalyst carriers of the type in which voids are uniformly distributed having narrow pore size distribution of two predetermined different radii, comprising the steps of (1) mixing a pulverized inorganic aggregate material with an inorganic bonding material to preform bonding granules and coating said bonding granules with an organic surface-forming material capable of being completely converted to a gaseous state at elevated temperature; (2) mixing said coated bonding granules with a pulverized inorganic aggregate material, a predetermined amount of a pulverized organic micro-hole forming material capable of being completely converted to a gaseous state at elevated temperature and having a predetermined particle size, and an inorganic bonding material to form aggregate grains, (3) mixing said aggregate grains with a predetermined amount of pulverized organic cave-shaped hole forming material capable of being completely converted to a gaseous state at elevated temperature and having a predetermined particle size and an inorganic bonding material to form pellets for the carriers; and sintering said pellets at a temperature of from 1000° C. to 1400° C.

7. A process of producing porous catalyst carriers of the type in which voids are uniformly distributed having narrow pore size distribution of at least three different radii, comprising the steps of (1) mixing a pulverized inorganic aggregate material with an inorganic bonding material and a predetermined amount of a pulverized organic micro-hole forming material capable of being completely converted to a gaseous state at elevated temperature and having a predetermined particle size of preform bonding granules and coating said bonding granules with an organic surface forming material capable of being completely converted to a gaseous state at elevated temperature, (2) mixing said coated bonding granules with a pulverized inorganic aggregate material, a predetermined amount of pulverized organic micro-hole forming material capable of being completely converted to a gaseous state and having a predetermined particle size, and an inorganic bonding material to form aggregate, grains, the last-mentioned mixing and forming operation being carried out separately the same times as the number of the radii minus two, with the last-mentioned organic material different in amount and particle size to form the corresponding groups of aggregate grains, and the groups of aggregate groups being mixed together to form the final aggregate grains; (3) mixing said final aggregate grains with a predetermined amount of pulverized organic cave-shaped hole-forming material capable of being completely converted to a gaseous state at elevated temperature and having a predetermined particle size and an inorganic bonding material to form pellets for the carriers; and (4) sintering said pellets at a temperature of from 1000° C. to 1400° C.

8. A process as claimed in claim 6, wherein said aggregate material is a material selected from the group consisting of fused aluminum oxide, silicon carbide, zircon and mixtures thereof.

9. A process as claimed in claim 7, wherein said aggregate material is a material selected from the group consisting of fused aluminum oxide, silicon carbide, zircon and mixtures thereof.

10. A process as claimed in claim 6, wherein said bonding material is selected from the group consisting of fusible clays, porcelain clays and mixture thereof.

11. A process as claimed in claim 7, wherein said bonding material is selected from the group consisting of fusible clays, procelain clays and mixture thereof.

12. A process as claimed in claim 6, wherein said organic materials are selected from the group consisting of walnut shell, Indian corn-core, cotton yarn waste, wooden scobs and styrene resins.

13. A process as claimed in claim 7, wherein said organic materials are selected from the group consisting of walnut shell, Indian corn-core, cotton yarn waste, wooden scobs and styrene resins.

14. A porous catalyst carrier as claimed in claim 1, wherein the carrier is in the form of a sphere.

15. A porous catalyst carrier as claimed in claim 1, wherein the carrier is in the form of a solid cylinder.

16. A porous catalyst carrier as claimed in claim 1, wherein the carrier is in the form of a hollow cylinder.

17. A porous catalyst carrier as claimed in claim 1, wherein the carrier is in the form of a cone.

18. A porous catalyst carrier as claimed in claim 1, wherein the carrier is in the form of a truncated cone.

19. A porous catalyst carrier as claimed in claim 1, wherein the catalyst is in the form of a disc.

20. A porous catalyst carrier as claimed in claim 1, wherein the catalyst is in the form of an annulus.

References Cited

UNITED STATES PATENTS

| | | | |
|---|---|---|---|
| 1,874,743 | 8/1932 | Harnsberger et al. | 252—477 XR |
| 3,145,183 | 8/1964 | Fisher | 252—438 XR |
| 3,172,893 | 3/1965 | Ameen | 252—477 XR |
| 3,207,700 | 9/1965 | Saffer | 252—477 XR |
| 3,361,682 | 1/1968 | Keith et al. | 252—477 XR |

PATRICK P. GARVIN, Primary Examiner

U.S. Cl. X.R.

252—449, 455, 463, 477